United States Patent [19]  
Hall et al.

[11] Patent Number: 4,542,170  
[45] Date of Patent: Sep. 17, 1985

[54] INTUMESCENT FLAME RETARDED POLYURETHANE COMPOSITIONS

[75] Inventors: Dale R. Hall, Avon Lake; Robert L. Jackson, Fairview Park, both of Ohio

[73] Assignee: The B. F. Goodrich Company, Akron, Ohio

[21] Appl. No.: 693,074

[22] Filed: Jan. 22, 1985

[51] Int. Cl.$^4$ ............................................. C09K 3/28
[52] U.S. Cl. ................................ 523/179; 521/85; 521/107; 521/165; 521/906; 521/907; 524/100; 524/120; 524/377; 524/590
[58] Field of Search ................. 523/179; 521/85, 107, 521/165, 906, 907; 524/100, 120, 590, 377

[56] References Cited

U.S. PATENT DOCUMENTS

| | | | |
|---|---|---|---|
| 4,193,945 | 3/1980 | Bertelli et al. | 524/100 |
| 4,201,705 | 5/1980 | Halpern et al. | 521/907 |
| 4,253,972 | 3/1981 | Fleenor, Jr. | 524/103 |
| 4,336,182 | 6/1982 | Landoni et al. | 524/100 |
| 4,336,184 | 6/1982 | Halpern | 521/179 |
| 4,338,245 | 7/1982 | Halpern | 521/182 |
| 4,338,246 | 7/1982 | Halpern | 521/907 |
| 4,342,682 | 8/1982 | Halpern et al. | 521/907 |
| 4,363,906 | 12/1982 | Cecchetti et al. | 524/593 |
| 4,404,291 | 9/1983 | Kiefer et al. | 501/81 |

Primary Examiner—Morton Foelak  
Attorney, Agent, or Firm—George A. Kap; Alan A. Csontos

[57] ABSTRACT

This invention relates to flame retarding compositions comprising a pentate salt selected from melammonium pentate and the pentate salt of ammelide, and a nitrogen-containing phosphate selected from amine phosphates, ammonium phosphates, and ammonium polyphosphates in amount of 25 to 95 volume % phosphate to 75 to 5 volume % pentate salt which produce unexpected results in thermoplastic polyurethane compositions in terms of oxygen index, and UL-94 rating. This invention also pertains to polyurethane compositions containing a thermoplastic polyurethane resin and a flame retarding combination of a pentate salt and a phosphate, defined above, in amount of 10 to 35 volume % of the two flame retarding components based on the total volume of the resin plus the two flame retarding componets. An aryl phosphate can also be included to enhance the flame retarding properties of thermoplastic polyurethanes. Such polyurethane compositions are intumescent, drip retardant, and are halogen-free.

25 Claims, No Drawings

INTUMESCENT FLAME RETARDED POLYURETHANE COMPOSITIONS

BACKGROUND OF THE INVENTION

This invention relates to intumescent, flame retardant polyurethane compositions containing an ammonium polyphosphate and a salt selected from melammonium pentate, pentate salt of ammelide, and mixtures of such salts, and optionally, triaryl phosphate. Such compositions are non-halogen, flame retardant, drip retardant during combustion, and are used at a level whereby the properties of the polyurethanes are not substantially degraded.

It is generally desirable to employ as little as possible of a flame retardant in the polyurethane compositions in order to minimize deleterious side effects on the physical properties. Examples of properties that are affected by the incorporation of flame retardants include elastic modulus, elongation at break, resilience, abrasion resistance, and thermal deformation temperature. Non-melting, particulate additives tend to be especially damaging to elastic properties whereas soluble, plasticizing additives tend to reduce thermal resistance.

Intumescent fire retardant compounds are characterized by their foaming and char-forming properties. The phenomenon of intumescent fire retardance is based on the production from the reagents of gaseous materials which expand the sample into a charred carbonaceous foam on heating. The charred foam is an insulator of low combustibility which, at the same time, retards the release of flammable gases from the heated mass.

Thermoplastic urethane elastomers, unlike most cross-linked rubbery materials, are readily processable by blow-molding, extrusion and injection molding equipment. Because of superior toughness and abrasion resistance, thermoplastic polyurethanes have found applications in such diverse uses as automotive fender extensions, roller skate wheels, pneumatic tubing, horseshoes, coated fabrics, wire and cable jackets, and the like.

Polyurethanes resins are, however, generally regarded as flammable, ranging from rapid-burning unmodified foam structures to slow-burning molded products. These materials also tend to degrade during burning to produce very low viscosity molten materials which tend to drip badly and spread the fire through flaming droplets.

Flame retarded polyurethane elastomer compositions containing halogen or phosphorus compounds are well known. Although such compositions are self-extinguishing and meet the UL-94 VO standard, the use of halogen-based flame retardants is not desirable for some applications. Halogen flame retardants, whether used alone or in conjunction with synergists such as antimony oxide, can limit the potential applications of the resin because they can produce undesirable acid vapors during decomposition. In the past, about 1 to 10%, on weight of the resin, of antimony compounds were added to the resin for flame-proofing. Antimony trioxide of fine particle size was used in preferred embodiments. Halogen compounds were also used in amount of 3 to 30%, based on the weight of the resin.

As already noted, thermoplastic polyurethane elastomers melt when exposed to flame and tend to contribute to spread of the fire by means of a flaming drip. Hence, drip retardation is a major consideration for any thermoplastic polyurethane flame retardant systems. Drip retardant, halogen-based thermoplastic polyurethane compositions exist, but they are objectionable in some applications due to vapor toxicity and corrosivity on combustion. Drip retardant, non-halogen or halogen-free based thermoplastic polyurethane compositions are also known but tend to require very high loadings which significantly reduce the key physical properties. This is particularly true of the softer thermoplastic polyurethanes which are desirable in the wire and cable industry for their superior flexibility at low temperatures.

Several patents appear to be pertinent to the subject matter claimed herein on the basis of disclosing a principal component thereof. U.S. Pat. No. 4,193,945 discloses self-extinguishing compositions comprising a polyolefin, an ammonium phosphate or polyphosphate, and a nitrogen-containing compound or a reaction product thereof with formaldehyde. The nitrogen-containing compounds are disclosed at bottom of column 1 but do not appear to be pertinent to the patentability issues herein. U.S. Pat. No. 4,201,705 discloses intumescent, non-dripping, flame retardant compositions containing a polyolefin and a flame retardant melammonium pentate or pentate salt of ammelide. A polyol can also be used in conjunction with the flame retardant. U.S. Pat. No. 4,253,972 discloses compositions comprising a polyolefin, an intumescent flame retardant melammonium pentate or pentate salt of ammelide, together with a polyhydric alcohol. U.S. Pat. No. 4,336,182 discloses anti-foaming and self-extinguishing compositions comprising a thermoplastic polymer such as polyolefin; a compound selected from amine phosphates, ammonium phosphates, and ammonium polyphosphates; together with a nitrogen-containing product. U.S. Pat. No. 4,342,682 discloses thermoplastic polyurethane elastomer compositions containing an intumescent additive melammonium pentate or pentate salt of ammelide together with a polyol. U.S. Pat. No. 4,363,906 discloses a solid water-insoluble condensation product of N,N'-ethyleneurea and formaldehyde that is different from a similar product disclosed in U.S. Pat. No. 4,193,945 and which is a better flame retardant for thermoplastic polymers, such as polypropylene, when combined with ammonium phosphate or polyphosphate. U.S. Pat. No. 4,404,291 discloses intumescent, fire retardant compositions for various polymers, including polyurethane resins, comprising a thermolized or heat-treated product obtained by reacting $P_2O_5$ or a $P_2O_5$ precursor with triethanolamine heated to expel volatiles.

SUMMARY OF THE DISCLOSURE

This invention pertains to intumescent, flame retardant compositions comprising two principal flame retardants. The first principal flame retardant is a nitrogen-containing phosphate selected from amine phosphates, ammonium phosphates, ammonium polyphosphates, and mixtures thereof, whereas the second principal flame retardant is a pentate salt selected from melammonium pentate, pentate salt of ammelide, and mixtures thereof. This invention also relates to intumescent and flame retardant thermoplastic polyurethane compositions containing one or more of the phosphates and one or more of the pentate salts, described above, which interact to produce unexpected results. The flame retardants are use in an amount of 5 to 50% by volume, based on the total volume of the polyurethane resin and the flame retardants, wherein the ratio of the flame retardants varies from 10-99% by volume of the nitrogen-containing phosphate to 90-1% by volume of the pentate salt, these amounts being based on 100 volume percent of the flame retardants. Additionally, an aryl phosphate can also be used in combination with the two principal flame retardants.

DETAILED DESCRIPTION OF THE INVENTION

The essence of this invention resides in the discovery of unexpected properties derived from the interaction of a nitrogen-containing phosphate and a pentate salt, the two principal flame retardants described herein. Incidentally, the principal flame retardants are individually known flame retardants in their own right. The unexpected properties referred to herein are especially pronounced when evaluating results of flame retarding tests such as the ASTM D-2863 Oxygen Index and the Underwriters Laboratories UL-94 Vertical Burning Test when conducted on test specimens made of thermoplastic polyurethane compositions. The presence of a material selected from aryl phosphates has been shown to enhance the flame retarding properties of the thermoplastic polyurethane compositions obtained as a result of the presence of the two principal flame retardants.

In the presence of a nitrogen-containing phosphate or a pentate salt, the differential thermogravimetric pattern of a polyurethane resin shows the appearance of a new thermal breakdown stage, which it is possible to assign to the liberation of ammonia. Ammonia is a noncombustible gas, which is known to be effective in altering the flammability limits of gaseous mixtures and thus in imparting flame retardance to a resin. In the presence of a nitrogen-containing phosphate and a pentate salt, both in the absence and presence of an aryl phosphate, there is an unexpectedly large growth in importance of this new thermal stage. This can only be attributed to an unexpected interaction between the nitrogen-containing phosphate and the pentate salt, probably in the condensed phase, forming an intumescent charry layer.

The intumescent and flame retarding compositions of this invention comprise a mixture of two principal flame retardants comprising a nitrogen-containing phosphate and a pentate salt present in the relative ratio of 10-99% by volume of the phosphate to 90-1% by volume of the pentate salt, based on 100% by volume of the two principal flame retardants. The preferred volume ratio is 25-95% phosphate and 5-75% pentate salt. This invention also relates to intumescent, flame retardant thermoplastic polyurethane compositions comprising a thermoplastic polyurethane resin together with a flame retarding combination of a nitrogen-containing phosphate and a pentate salt, noted above. Amount of the flame retardants can vary within the range of 5-50%, preferably 10-35% by volume based on the total volume of the polyurethane resin and the flame retardants.

The compositions disclosed herein can also contain a third flame retardant selected from aryl phosphates. Amounts of the aryl phosphates can vary from 0 to 20%, preferably 1 to 10% by volume, based on the combined volumes of the resin and the three flame retardants. In the case of the flame retarding compositions devoid of resin, amount of the aryl phosphates can vary from 0 to 50% by volume, preferably from 10 to 30% by volume, based on the combined volumes of only the two principal flame retardants.

It should be understood that the ultimate criterion for the use of the flame retardants disclosed herein is the effective amount to achieve the desired objective.

The polyurethanes are generally divided into thermoplastics and thermosets, and the thermoplastics are further divided into plastics and elastomers. This invention is directed to thermoplastic polyurethanes, including plastics and elastomers.

The flame retardant thermoplastic polyurethane compositions disclosed herein are free of halogens. For use particularly in wire and cable jackets and other similar applications, the compositions of this invention should be drip retardant, should have Durometer hardness of about 70A to 60D, preferably 80A to 50D, and meet the following specifications:

Oxygen Index (OI)—29 or greater
UL94—VO
Tensile Strength—8 MPa or greater
Elongation—200% or greater
Tear strength—5 N/mm or greater
Vicat Softening Temp.—70° C. or greater The invention herein is directed to flame retardance of polyurethanes, including plastics and elastomers. In a preferred embodiment, this invention is directed to thermoplastic polyurethane elastomers which are distinguished from the corresponding plastics on the basis of the glass transition temperature (Tg). The thermoplastic polyurethane elastomers have Tg of below 0° C., and preferably in the range of −10° C. to −55° C.

Thermoplastic polyurethanes are well known and are commercially available. They comprise a broad family of compositions having both urethane segments and non-urethane segments, with flammability characteristics varying widely depending on the composition thereof. The polyurethanes are generally prepared from a diisocyanate, a polyester or polyether or other macroglycol, and a low molecular weight chain extender, such as a glycol or a diamine. If a cellular or a foamed polyurethane is desired, gas-generating additives, such as water or other blowing agents, are included in the reaction mixture.

The patent literature is replete with disclosures of suitable polyurethanes. U.S. Pat. No. 4,397,974 discloses preparation of thermoplastic polyurethane elastomers by reacting a long-chain polyol having molecular weight in the range of about 400 to 10,000, preferably 800 to 6,000; with a polyisocyanate, preferably a diisocyanate; and a chain extender having a molecular weight of up to about 400. The preferred chain extenders are short-chain polyols having molecular weight of up to 380. The equivalent ratio of isocyanate groups to the active hydrogen atoms, or the NCO/OH ratio, is in the range of 0.90 to 1.10, preferably in the range of 0.98 to 1.04.

Virtually any linear macroglycol is suitable for thermoplastic polyurethanes. Suitable macroglycols are selected from polyester, polylactone, polyether, polythioether, polyamide, polycarbonate, polydiene, and polyacetal glycols, that contain two Zerewitinoff-active groups, preferably hydroxyl groups. The preferred macroglycols are polytetramethylene ether glycol, polytetramethylene adipate glycol, and polyhexamethylene carbonate glycol.

The diisocyanates that are suitable in the preparation of thermoplastic polyurethanes include aliphatic, cycloaliphatic, arylaliphatic, aromatic, and heterocyclic diisocyanates. Specific examples of suitable diisocyanates include hexamethylene diisocyanate, isophorone diisocyanate, naphthalene-1,5-diisocyanate, tolylene diisocyanates, and the diphenyl methane diisocyanate isomers. A particularly preferred diisocyanate is 4,4'-diisocyanato-diphenyl methane (MDI).

Suitable chain extenders can be used herein. Such extenders are low molecular weight polyalcohols, preferably diols, polyamines and aminoalcohols, hydrazines, and hydrazide derivatives. Preferred chain extenders are diols such as ethylene glycol, di- and tri-ethylene glycol, 1,6-hexane diol, and hydroquinone di-$\beta$-hydroxyethyl ether. Most preferred, however, is 1,4-butanediol.

The thermoplastic polyurethanes prepared as generally described herein, have a Shore Hardness in the range of 70A to about 60D. This corresponds to a molar ratio of a long-chain polyol to a chain extender of about 1/1 to ¼.

It should be understood that the resin referred to herein can include up to 5% of conventional additives that are added during preparation of the resin itself. Such additives can include UV stabilizers, antioxidants, lubricants, plasticizers, pigments, and the like.

Suitable polyurethanes are also disclosed by U.S. Pat. No. 3,214,489. These are hard thermoplastic polyurethanes having high strength and good flexibility. Such resins are reaction products of aromatic polycarbonates and aromatic diisocyanates which can be chain-extended with a glycol. A relatively low molecular weight hydroxyl-terminated polyester can also be used to properly balance flexibility with hardness.

Also suitable are thermoplastic polyurethanes disclosed in U.S. Pat. No. 3,509,233 which have very high resistance to hydrolysis. This patent discloses that it is known to prepare such resins by reacting a linear, dihydroxy compound of high molecular weight with a diisocyanate and a low molecular weight chain extender that contains at least two hydrogen atoms that are reactive with isocyanates. The high molecular weight dihydroxy compounds are usually hydroxyl-containing polyesters of dicarboxylic acids, such as adipic acid polyesters. The hydrolysis resistant polyurethane elastomers can be prepared by using, instead of the polyesters, the hydroxyl-containing polycarbonates containing 1,6-hexanediol, or a like glycol. In a preferred embodiment, therefore, 1,6-hexanediol polycarbonate, that is used as the hydroxypolyester, is prepared by reacting 1,6-hexanediol with a diarylcarbonate, such as diphenylcarbonate, by either heating the reactants alone or in the presence of an ester interchange catalyst. Polycarbonates of molecular weight in the range of about 1500 to 3000 are preferred, especially 1500 to 2000. The hexane polycarbonate thus obtained is a pale wax which has a softening range of 38° to 52° C., depending on its molecular weight.

Preparation of the thermoplastic polyurethanes can be made in any suitable manner. For instance, in the casting process, a mixture of a linear hydroxyl polyester and a polycarbonate is reacted in a mold with an excess of a diisocyanate and, after addition of a chain extender, the resulting prepolymer liquid is poured into a mold. The product hardens in a short time and can be removed from the mold. The heating step can be carried out at 100° C. for 24 hours. In another procedure, a mixture is prepared of a hydroxyl polyester, a polycarbonate, and a chain extender, the mixture is reacted with an equivalent or an excess quantity of a diisocyanate, and then thermoplastically shaped with heat and pressure after granulation.

Depending on the proportion of the reactants employed, polyurethane resins having different degrees of hardness and elasticity can be obtained. The hardness of such resins generally increases with increasing quantities of diisocyanate and glycol and diminishes with decreasing quantities of diisocyanate and glycol.

Suitable polyurethane elastomers herein also include those described in U.S. Pat. No. 4,342,682. Such resins are linear, thermoplastic polymers containing alternating hard and soft segments and cross-linked through thermally-reversible linkages. Property variations can thus be selectively accomplished by varying the proportion of hard and soft segments in the polymer chain to give materials ranging from soft, tough rubbers to hard and rigid plastics. These resins, known also as elastoplastics, are readily available commercially in pre-compounded and pelletized form.

Preparation of thermoplastic polyurethane elastomers is well known in the art. In one particular embodiment, the resin was prepared by blending at 60° C. one mole of polyhexamethylene carbonate glycol with 2.4 moles of 1,4-butanediol chain extender. The polyhexamethylene carbonate glycol, i.e., hydroxyl terminated polycarbonate of 2000 molecular weight, was prepared pursuant to the procedure outlined in Example 1 of U.S. Pat. No. 4,131,731. This blend or physical mixture was then reacted with 3.4 moles of methylene-bis-diphenyl diisocyanate (MDI) by the standard high temperature random melt polymerization procedure. This procedure involved the separate heating of the polycarbonate and MDI to about 100° C., followed by mixing of the ingredients. Reaction is exothermic and raises temperature to about 200°–250° C. in about 1–5 minutes, during which time, polymerization takes place as evidenced by an increase in viscosity. This resin is essentially free of isocyanate (NCO) groups. The backbone of this polyurethane was polyhexamethylene carbonate glycol with molecular weight of 2000 and the blend thereof with 1,4-butanediol had molecular weight of 650.

Polyhexamethylene carbonate glycol of 900 molecular weight, polytetramethylene adipate glycol of 1000 molecular weight, and polytetramethylene ether glycol of 1000 molecular weight can, likewise, be reacted to produce thermoplastic polyurethanes. Molecular weight of such hydroxyl terminated polycarbonates can be in the range of 500 to 10,000, preferably 500 to 2500.

The first essential component of the flame retardant combination of this invention is a pentate salt selected from pentate salts of an amino-s-triazine. As is disclosed in U.S. Pat. No. 4,154,930, which is incorporated herein by reference for its description and preparation of the pentate salts, the amino-s-triazines of the formula

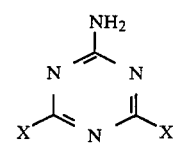

where X is —NH$_2$ or —OH, are known, as well as many derivatives thereof. The compound where X is NH$_2$ is melamine and the compound where X is OH is ammelide. The spiro compounds of the formula

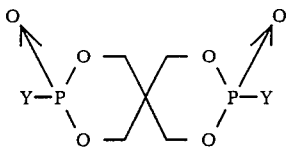

where Y is —OR or —Cl, are also well known and are referred to as derivatives of pentaerythrytol diphosphates or by the coined term of "pentates". Where Y is Cl, the compound is called dichloropentate.

The amino-s-triazines react with the hydrolysis product of dichloropentate to form water-insoluble or sparingly soluble salts of the structure

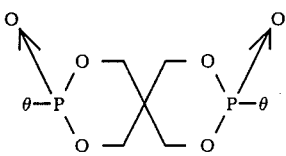

wherein X is selected from —NH$_2$ and —OH. Where X is NH$_2$, the compound is referred to herein as melammonium pentate, and where X is OH, the compound is referred to herein as pentate salts of ammelide. Both of these compounds are suitable herein. Such compounds are used in plastics as blowing agents, char-forming additives, and the like.

The pentate salts of amino-s-triazines are readily prepared by first hydrolyzing a pentate compound, such as dichloropentate, to provide a free acid, and then, reacting that product with the requisite amount of amino-s-triazine to form a sparingly soluble salt. More specifically, the dichloropentate can be first hydrolyzed by warming it with an aqueous alkali. The resulting product can then be added to a warm (70°-100° C.) aqueous solution of the amino-s-triazine containing sufficient mineral acid to dissolve the triazine. The sparingly soluble pentate salt precipitates from solution as a fine powder or as a crystalline material. Alternatively, an acid acceptor, such as a tertiary amine, can be used in place of the alkali to promote the hydrolysis reaction. As another alternative, the amino-s-triazine can be added to the aqueous mixture prior to hydrolysis, whereupon the pentate salt is formed and precipitates out as hydrolysis proceeds.

The pentate salts described herein are sufficiently stable to permit compounding and thermal processing thereof in conventional equipment. When heated to temperatures substantially greater than about 250° C., compositions containing the pentate salts expand due to thermal decomposition of the pentate salt and produce foam structures.

The second essential component of the flame retardant combination is a nitrogen-containing phosphate selected from amine phosphates, ammonium phosphates, and ammonium polyphosphates. Suitable amine phosphates include dimethylammonium phosphate, diethylammonium phosphate, ethylenediamine phosphate, and melamine orthophosphate and pyrophosphate. The preferred ammonium polyphosphates have the general formula $(NH_4)_{n+2}P_nO_{3n+1}$ where n is greater than 2. The molecular weight of these polyphosphates should be sufficiently high to ensure a low solubility in water, which is indicated by n being between 400 and 800. Metaphosphates, generally having the formula $(NH_4PO_3)_n$, are also suitable herein. One commercial polyphosphate that is well known is "Phos-Chek P/30", which has analogous structure to $(NH_4)_{n+2}P_nO_{3n+1}$, where n is greater than 50.

There are five known crystalline forms or polymorphs of the ammonium polyphosphates. These forms differ in density or crystalline structure, and possibly other respects. The forms are identified as Forms I, II, III, IV, and V. For purposes herein, Forms I and II are known to be suitable, although Form II is preferred because of its enhanced thermal stability. Form II can be easily prepared from Form I by tempering it at 200° to 375° C. in a well-covered container. Form I can be prepared by heating equimolar mixture of $NH_4H_2PO_4$ and urea under anhydrous ammonia at 280° C. for 16 hours. Form I has a density of 1.79 g/cc whereas Form II has a density of 1.94 g/cc. The other three forms of ammonium polyphosphate are not available.

The amount of the two principal flame retardants should be sufficient to render a thermoplastic polyurethane intumescent, flame retardant, and drip retardant. Some or all of these criteria can be measured by standard methods for determining Oxygen Index and UL94 Rating. More specifically, total amount of the retardant in a resin can be in the range of 5–50%, preferably 10–35% by volume, based on the total volume of the resin and the two flame retardants. As between the flame retardants themselves, amount of the nitrogen containing phosphate can be in the range of 10–99%, preferably 25–95% by volume, whereas amount of the pentate salt can be in the range of 90–1%, preferably 75–5% by volume, based on the total volume of the two principal flame retardants. The flame retardants can be added to the resin individually or as a single admixture, together with other desired additives.

The third flame retardant is selected from aryl phosphates. These aryl phosphates are known flame retardant plasticizers in the plastics industry. Suitable aryl phosphates for purpose herein include triaryl phosphates and alkyl aryl phosphates wherein the aryl moiety is preferably selected from substituted and unsubstituted phenyl groups. Specific examples thereof include isodecyl diphenyl phosphate, tricresyl phosphate, isopropylphenyl diphenyl phosphate, diisopropyl phenyl phenyl phosphate, p-tert-butylphenyl diphenyl phosphate, di-p-tert-butylphenyl diphenyl phosphate, p-tert-butyl triphenyl phosphate, and mixed isopropyl-phenyl diphenyl phosphate and phenyl diisopropylphenyl phosphate.

As already mentioned, particle size of flame retardants, and any other additives that are added to the resin, is very important since physical properties of the resulting products are significantly affected. Generally, the finer the particle size the better. Although any available particulate flame retardants can be used successfully in the invention disclosed herein, it is preferred to use flame retardants of fine particle size. This applies to the phosphate and the pentate salt. Therefore, it is preferred to use flame retardants having an average particle size of less than 30 microns, and especially about 10 microns or less. The particle distribution of these materials is such that about 50% of the particles are less than 30 microns, preferably less than 10 microns.

It should be understood that, in addition to the flame retardants described herein, other additives can be employed in preparing polyurethane compositions. Examples of such additives are antioxidants, UV-stabilizers, lubricants, fillers, pigments, plasticizers, and the like.

The additives referred to herein are added to the polyurethane composition as distinguished from polyurethane resin.

Compounding of the fire-retarded thermoplastic polyurethanes can be carried out by mixing the additives with a thermoplastic resin and extruding the compounded composition. The extrudate is then chopped into pellets which are injection or compression molded to form test specimens to facilitate testing of the composition for various properties. The level of the self-extinguishing potential of the composition was determined on test bars measuring 75 mm×6.5 mm×2 mm±0.25 mm to determine Oxygen Index by the ASTM D-2863 test. This index expresses the minimum percentage of oxygen in a flowing mixture of oxygen and nitrogen required to support flaming combustion. A high index indicates a lesser probability of burning since a greater amount of oxygen would be required to support combustion. Therefore, an oxygen index of 21.0 means that combustion can be supported in air whereas an index of 30.0, indicates that the relative amount of oxygen in the environment of the sample must be considerably greater than what is found in air, to support combustion. The composition was also tested pursuant to UL-94 standard to determine the self-extinguishing property of the composition. The UL-94 test provides for different test conditions and permits classification of the samples at different self-extinguishing levels of V-0 and V-2, by the Vertical Burning Test. There are five criteria set forth for V-0 and V-2 ratings. The more significant ones for purposes herein are B and D, which are set forth below to facilitate comparison:

| 94 V-0 Rating | 94 V-2 Rating |
| --- | --- |
| B. Not have a total flaming combustion time exceeding 50 seconds for the 10 flame applications for each set of 5 specimens. | B. Not have a total flaming combustion time exceeding 250 seconds for the 10 flame applications for each set of 5 specimens. |
| D. Not have any specimens that drip flaming particles that ignite dry absorbent surgical cotton located 305 mm below the test specimen. | D. Be permitted to have specimens that drip flaming particles that burn only briefly, some of which ignite the dry absorbent surgical cotton located 305 mm below the test specimen |

It should be pointed out that for each evaluation, 5 test samples are used. The test conditions require that there be a total of 2 ignitions per sample. This is accomplished by igniting each sample for 10 seconds, removing the flame, and noting the time it takes for the flame to extinguish itself. After the sample becomes extinguished, it is ignited a second time and the steps are repeated. The total flaming combustion time is, therefore, the sum of the 10 time periods in seconds that are noted, each indicating the time it takes a flame to extinguish itself after flame removal. Also given is the number of test samples that dripped and those that ignited. For instance, test results given as Drippers/Igniters of 1/0 means that of the 5 samples tested, one sample dripped and none ignited.

An additional test is also used to indicate flammability or lack of it with respect to a test sample. In this test, the objective is to determine the time interval of flame application until dripping takes place. To achieve this objective, a flame is applied and kept on the sample until the test sample drips, at which time, the flame is removed and the elapsed time is recorded as "Time to Drip" in seconds. This should be as long as possible, preferably in excess of 20 seconds.

The thermoplastic polyurethane compositions tested herein contained the following components:
(a) thermoplastic polyurethane resin
(b) melammonium pentate
(c) ammonium polyphosphate
(d) triaryl phosphate
(e) titanium dioxide pigment
(f) wax lubricant The thermoplastic polyurethane resin can be obtained by reacting a macroglycol of 1000 molecular weight of polytetraethylene ether glycol, with 4,4'-diphenylmethene diisocyanate (MDI), and 1,4-butanediol, in the presence of the usual antioxidants and UV stabilizers, that amount to a couple of percent. The resin is prepared by the one-step melt polymerization procedure and has the following characteristics:

Melt index (@ 210° C. and 3800 g load): 20
Shore Hardness (ASTM D-2240): 85A
Tg: −49° C.
Specific gr.: 1.13
Ult. Tensile Strength (ASTM D-412): 47 MPa
Ult. Elongation (ASTM D-412): 530%
OI: 22
UL Rating: V2 (at 3 thicknesses)

Melammonium pentate (MP) and ammonium polyphosphate (APP) had average particle size of about 10 microns. The ammonium polyphosphate used was Phos-Chek P/30 from Monsanto Industrial Chemicals Company, that is believed to have the formula $(NH_4)_{n+2} P_2O_{3n+1}$ where n is greater than 50, preferably between 400 and 800. This phosphate was of a fine grind and had the Form II structure. The melammonium pentate used was identified as micronized Incindex XP-1699, available from Borg-Warner Chemicals, Inc. Density of melammonium pentate was 1.67 g/cc, density of the pigment was 4.10 g/cc, and density of the wax was 1.01 g/cc.

The thermoplastic polyurethane (TPU) resin was compounded in a conventional way with other additives, but without the triaryl phosphate, in amounts given below in volume percent and then test samples were prepared in 3 thicknesses (t) of 1.9 millimeter, 2.4 mm, and 2.9 mm. After testing in the manner described, the following results given in Table I were obtained, where TPU designates the thermoplastic polyurethane resin, MP designates the melammonium pentate, and APP represents the ammonium polyphosphate:

TABLE I

| | P1 | P2 | P3 | P4 | P5 |
| --- | --- | --- | --- | --- | --- |
| TPU Resin | 75.87 | 75.87 | 75.87 | 75.87 | 75.87 |
| MP | 0 | 5.53 | 11.07 | 16.60 | 22.13 |
| APP | 22.13 | 16.60 | 11.07 | 5.53 | 0 |
| Pigment | 1 | 1 | 1 | 1 | 1 |
| Wax Lubricant | 1 | 1 | 1 | 1 | 1 |
| Oxygen Index (1.9 mm) | 25.8 | 32.8 | 30.1 | 27.4 | 24.9 |
| UL94 t = 1.9 mm | | | | | |
| Flame Time | 37 | 11 | 14 | 34 | 42 |
| Drippers/Igniters | 5/5 | 5/2 | 5/4 | 4/4 | 5/5 |
| Time to Drip | 16 | 20 | 20 | 24 | 17 |
| UL Rating | V2 | V2 | V2 | V2 | V2 |
| UL94 t = 2.4 mm | | | | | |
| Flame Time | 70 | 26 | 13 | 24 | 78 |
| Drippers/Igniters | 5/5 | 1/1 | 3/1 | 4/2 | 5/5 |

TABLE I-continued

| | | | | | |
|---|---|---|---|---|---|
| Time to Drip | 23 | 28 | 22 | 25 | 22 |
| UL Rating | V2 | V2 | V2 | V2 | V2 |
| UL94 t = 2.9 mm | | | | | |
| Flame Time | 106 | 13 | 11 | 12 | 110 |
| Drippers/Igniters | 5/5 | 0/0 | 0/0 | 0/0 | 5/5 |
| Time to Drip | 31 | 25 | 27 | 28 | 31 |
| UL Rating | V2 | V0 | V0 | V0 | V2 |
| Shore A/D Hardness | 90/50 | 89/50 | 90/50 | 90/51 | 90/52 |
| Tensile Yield | | | | | |
| @51 cm/min (MPa) | 5.0 | 6.6 | 7.0 | 7.7 | 9.4 |
| Ult. Tensile (MPa) | 12.8 | 13.5 | 12.5 | 13.4 | 13.3 |
| Ult. Elongation (%) | 575 | 590 | 575 | 580 | 535 |

| | Q1 | Q2 | Q3 | Q4 | Q5 |
|---|---|---|---|---|---|
| TPU Resin | 68.92 | 68.92 | 68.92 | 68.92 | 68.92 |
| MP | 0 | 7.27 | 14.54 | 21.81 | 29.08 |
| APP | 29.08 | 21.81 | 14.54 | 7.27 | 0 |
| Pigment | 1 | 1 | 1 | 1 | 1 |
| Wax Lubricant | 1 | 1 | 1 | 1 | 1 |
| Oxygen Index (1.9 mm) | 26.8 | 43.1 | 36.8 | 32.8 | 25.2 |
| UL94 t = 1.9 mm | | | | | |
| Flame Time | 47 | 10 | 10 | 16 | 81 |
| Drippers/Igniters | 5/5 | 4/1 | 2/0 | 3/0 | 5/5 |
| Time to Drip | 18 | 22 | 22 | 23 | 24 |
| UL Rating | V2 | V2 | V0 | V0 | V2 |
| UL94 t = 2.4 mm | | | | | |
| Flame Time | 114 | 12 | 10 | 12 | 103 |
| Drippers/Igniters | 2/2 | 1/0 | 0/0 | 0/0 | 5/5 |
| Time to Drip | 27 | 22 | 28 | 33 | 27 |
| UL Rating | V2 | V0 | V0 | V0 | V2 |
| UL94 t = 2.9 mm | | | | | |
| Flame Time | 69 | 10 | 10 | 13 | 213 |
| Drippers/Igniters | 0/0 | 0/0 | 0/0 | 0/0 | 3/3 |
| Time to Drip | 38 | 32 | 31 | 32 | 56 |
| UL Rating | V0 | V0 | V0 | V0 | NONE |
| UL94 t = 2.9 mm | | | | | |
| Flame Time | 18 | 10 | 10 | 10 | 195 |
| Drippers/Igniters | 0/0 | 0/0 | 0/0 | 0/0 | 1/1 |
| Time to Drip | 48 | 32 | 36 | 48 | 51 |
| UL Rating | V0 | V0 | V0 | V0 | NONE |
| Shore A/D Hardness | 91/53 | 92/57 | 92/57 | 92/58 | 92/58 |
| Tensile Yield | | | | | |
| @51 cm/min (MPa) | 3.5 | 7.6 | 7.9 | 8.5 | 10.6 |
| Ult. Tensile (MPa) | 7.1 | 7.6 | 6.2 | 8.5 | 10.6 |
| Ult. Elongation (%) | 435 | 470 | 240 | 45 | 60 |

| Drippers/Igniters | 3/3 | 0/0 | 0/0 | 0/0 | 5/4 |
|---|---|---|---|---|---|
| Time to Drip | 35 | 32 | 35 | 32 | 35 |
| UL Rating | V2 | V0 | V0 | V0 | NONE |
| Shore A/D Hardness | 90/50 | 91/54 | 91/54 | 91/54 | 91/57 |
| Tensile Yield | | | | | |
| @51 cm/min (MPa) | 4.6 | 7.1 | 7.6 | 8.4 | 10.3 |
| Ult. Tensile (MPa) | 10.6 | 9.5 | 9.1 | 9.1 | 10.0 |
| Ult. Elongation (%) | 540 | 510 | 510 | 500 | 410 |

| | R1 | R2 | R3 | R4 | R5 |
|---|---|---|---|---|---|
| TPU Resin | 61.66 | 61.66 | 61.66 | 61.66 | 61.66 |
| MP | 0 | 9.09 | 18.17 | 27.26 | 36.34 |
| APP | 36.34 | 27.26 | 18.17 | 9.09 | 0 |
| Pigment | 1 | 1 | 1 | 1 | 1 |
| Wax Lubricant | 1 | 1 | 1 | 1 | 1 |
| Oxygen Index (1.9 mm) | 29.5 | 51.8 | 38.1 | 36.5 | 27.1 |
| UL94 t = 1.9 mm | | | | | |
| Flame Time | 30 | 10 | 10 | 10 | 139 |
| Drippers/Igniters | 5/5 | 1/0 | 0/0 | 0/0 | 5/5 |
| Time to Drip | 23 | 23 | 25 | 35 | 27 |
| UL Rating | V2 | V0 | V0 | V0 | NONE |
| UL94 t = 2.4 mm | | | | | |
| Flame Time | 25 | 10 | 10 | 10 | 226 |

In Table I, above, the various test samples are identified by a capital letter and a number, as P1, P2, Q1, Q2, R1, R2, etc. The contents of the thermoplastic polyurethane composition that was used to prepare the test samples is given directly below followed by test results on the test samples. The test results given include Oxygen Index, Flame Time, Drippers/Igniters, Time To Drip, and UL-94 Rating for the 3 thicknesses of the test samples used. This is followed by certain of the physical properties of the particular compositions.

For the purpose of facilitating the comparison of the oxygen index, the UL-94 rating, and other criterion given in Table I, the same data is given in Table II, below, in a rearranged form which permits an easier comparison of the several criteria:

TABLE II

| No. | V % FR | APP/MP Ratio | O.I. @ 1.9 mm | Shore Hardness | UL94 vs. thickness 1.9 mm | 2.4 mm | 2.9 mm | Ult. Ten (MPa). | Ult. % Elong. |
|---|---|---|---|---|---|---|---|---|---|
| P1 | 22.1 | 100/0 | 25.8 | 90A/50D | V2 | V2 | V2 | 12.8 | 575 |
| P2 | 22.1 | 75/25 | 32.8 | 89A/50D | V2 | V2 | V0 | 13.5 | 590 |
| P3 | 22.1 | 50/50 | 30.1 | 90A/50D | V2 | V2 | V0 | 12.5 | 575 |
| P4 | 22.1 | 25/75 | 27.4 | 90A/51D | V2 | V2 | V0 | 13.4 | 580 |
| P5 | 22.1 | 0/100 | 24.9 | 90A/52D | V2 | V2 | V2 | 13.3 | 535 |
| Q1 | 29.1 | 100/0 | 26.8 | 90A/50D | V2 | V2 | V2 | 10.6 | 540 |
| Q2 | 29.1 | 75/25 | 43.1 | 91A/54D | V2 | V0 | V0 | 9.5 | 510 |
| Q3 | 29.1 | 50/50 | 36.8 | 91A/54D | V0 | V0 | V0 | 9.1 | 510 |
| Q4 | 29.1 | 25/75 | 32.8 | 91A/54D | V0 | V0 | V0 | 9.1 | 500 |
| Q5 | 29.1 | 0/100 | 25.2 | 91A/57D | V2 | V2 | NONE | 10.0 | 410 |
| R1 | 36.3 | 100/0 | 29.5 | 91A/53D | V2 | V0 | V0 | 7.1 | 435 |
| R2 | 36.3 | 75/25 | 51.8 | 92A/57D | V0 | V0 | V0 | 7.6 | 470 |
| R3 | 36.3 | 50/50 | 38.1 | 92A/57D | V0 | V0 | V0 | 6.2 | 240 |
| R4 | 36.3 | 25/75 | 36.5 | 92A/58D | V0 | V0 | V0 | 8.5 | 45 |
| R5 | 36.3 | 0/100 | 27.1 | 92A/58D | NONE | NONE | NONE | 10.6 | 60 |
| Control TPU Resin | | | | 85A/40D | V2 | V2 | V2 | 43.7 | 530 |

In the above Tables I and II, the entry "NONE" means that the sample did not meet any UL-94 criterion, i.e., the sample performed poorly. Furthermore, the volume percent loading for sample P1 (22.1%) was obtained by dividing 22.13 volume% ammonium polyphosphate (APP) by the combined amounts of the TPU resin, 75.87 volume %, and APP, 22.13 volume %, which amounts are given in Table I. The ratio of the fire retardants in test sample P1 was 100 volume % ammonium polyphosphate (APP) to 0 volume % of melammonium pentate (MP). No triaryl phosphate (TAP) was used in these compositions. Oxygen index (OI) of PI test sample 1.9 mm thick was 25.6, its shore hardness was 90A or 50D, and the UL-94 rating for all three thicknesses was V2. Ultimate tensile strength and ultimate % elongation of the P1 test sample are also given.

The tabulation in Table II illustrates the unexpected interaction between melammonium pentate and ammonium polyphosphate. This is particularly evident from the examination of the oxygen index results as well as UL-94 ratings.

For instance, Table II shows that the incidence of VO UL ratings is greater in certain relative ratios of APP to MP. It is also apparent from Table II that the incidence of VO ratings also increases with thickness, which is plausible. In the case of test sample having a fire retardant loading of 29.1 volume %, the incidence of VO ratings increases and is apparent in the relative ratio ranging from 75/25 to 25/75, APP/MP.

The unexpected flame retardancy properties of APP in combination with MP in various ratios are also reflected in the oxygen index. For instance, at a loading of 22.1 volume % of the flame retardants, oxygen index of test sample with only APP was 25.8 whereas with only MP, it was 24.9. However, when a combination of these flame retardants was used, the oxygen index varied from 27.4 to 32.8.

Similar tests were carried out on the same thermoplastic polyurethane compositions, as above, except that a triaryl phosphate (TAP) was also included. The triaryl phosphate enhances flame retardancy of thermoplastic polyurethanes. Kronitex 100, available from FMC Corporation, was the triaryl phosphate used, which more generally is a mixture of isopropylphenyl and phenyl phosphates. The triaryl phosphate was a liquid and had specific gravity of 1.16. The results given in Table III, below, reflect the effect of TAP on flame retarding properties, as well as on ultimate tensile and elongation.

TABLE III

|                    | S1   | S2   | S3   | S4   | S5   |
|--------------------|------|------|------|------|------|
| TPU Resin          | 68   | 68   | 68   | 68   | 68   |
| MP                 | 0    | 6    | 12   | 18   | 24   |
| APP                | 24   | 18   | 12   | 6    | 0    |
| TAP                | 6    | 6    | 6    | 6    | 6    |
| Pigment            | 1    | 1    | 1    | 1    | 1    |
| Wax Lubricant      | 1    | 1    | 1    | 1    | 1    |
| Oxygen Index (1.9 mm) | 26.5 | 32.8 | 32.6 | 30.1 | 25.2 |
| UL94 t = 1.9 mm    |      |      |      |      |      |
| Flame Time         | 42   | 10   | 11   | 20   | 38   |
| Drippers/Igniters  | 5/5  | 4/1  | 5/3  | 4/2  | 5/5  |
| Time to Drip       | 17   | 20   | 22   | 23   | 17   |
| UL Rating          | V2   | V2   | V2   | V2   | V2   |
| UL94 t = 2.4 mm    |      |      |      |      |      |
| Flame Time         | 58   | 11   | 15   | 27   | 61   |
| Drippers/Igniters  | 5/5  | 1/0  | 3/0  | 2/0  | 5/5  |
| Time to Drip       | 20   | 23   | 22   | 24   | 21   |
| UL Rating          | V2   | V0   | V0   | V0   | V2   |
| UL94 t = 2.9 mm    |      |      |      |      |      |
| Flame Time         | 86   | 12   | 15   | 15   | 94   |
| Drippers/Igniters  | 5/5  | 0/0  | 0/0  | 0/0  | 5/5  |
| Time to Drip       | 25   | 27   | 39   | 30   | 27   |
| UL Rating          | V2   | V0   | V0   | V0   | V2   |
| Shore A/D Hardness | 88/47| 88/47| 88/48| 89/49| 88/49|
| Tensile Yield      |      |      |      |      |      |
| @51 cm/min (MPa)   | 4.5  | 6.2  | 6.4  | 6.9  | 8.4  |
| Ult. Tensile (MPa) | 11.5 | 10.4 | 10.8 | 11.2 | 12.1 |
| Ult. Elongation (%)| 600  | 525  | 600  | 580  | 545  |

For the purpose of facilitating the comparison of the properties listed in Table III, the results are tabulated in a different arrangement, as shown in Table IV, below:

TABLE IV

| No. | V % Fr | APP/MP Ratio | V % TAP | O.I. @ 1.9 mm | Shore Hardness | UL94 vs. thickness | | | Ult. Ten (MPa) | Ult. % Elong. |
|-----|--------|--------------|---------|---------------|----------------|--------------------|------|------|----------------|---------------|
|     |        |              |         |               |                | 1.9 mm | 2.4 mm | 2.9 mm |                |               |
| S1  | 24     | 100/0        | 6       | 26.5          | 88A/47D        | V2     | V2     | V2     | 11.5           | 600           |
| S2  | 24     | 75/25        | 6       | 32.8          | 88A/47D        | V2     | V0     | V0     | 10.4           | 525           |
| S3  | 24     | 50/50        | 6       | 32.6          | 88A/48D        | V2     | V0     | V0     | 10.8           | 600           |
| S4  | 24     | 25/75        | 6       | 30.1          | 89A/49D        | V2     | V0     | V0     | 9.3            | 580           |
| S5  | 24     | 0/100        | 6       | 25.2          | 88A/49D        | V2     | V2     | V2     | 12.1           | 545           |

As should be apparent from the above data, oxygen index shows particularly unexpected results both with and without the triaryl phosphate, with a maximum at about 75:25 ratio of APP to MP. The UL-94 ratings are very sensitive to specimen thickness and show particularly unexpected results at APP to MP ratios of 1:3 to 3:1. The unexpected interaction between APP and MP in the presence of triaryl phosphate is also in evidence in test results for flame time, drippers and igniters, and time to drip. It is also important to note that the superior results were obtained at loadings which are considered to be low by industry standards in obtaining intumescent, drip retardant, halogen-free thermoplastic polyurethane compositions.

We claim:

1. An intumescent composition adapted to render thermoplastic polyurethane compositions flame retardant comprising a pentate salt of an amino-s-triazine, or a mixture thereof, and a nitrogen-containing phosphate selected from amine phosphates, ammonium phosphates, ammonium polyphosphates, and mixtures thereof.

2. Composition of claim 1 wherein said flame retardants are present in the composition in amount of 10 to 99 volume % of said nitrogen-containing phosphate to 90 to 1 volume % of said pentate salt.

3. Composition of claim 1 wherein said flame retardants are present in the composition in amount of 25 to 95 volume % of said nitrogen-containing phosphate to 75 to 5 volume % of said pentate salt.

4. Composition of claim 3 wherein said pentate salt is selected from melammonium pentate, the pentate salt of ammelide, and mixtures thereof; and said nitrogen-containing phosphate is selected from ammonium polyphosphates of the formula $(NH_4)_{n+2}P_nO_{3n+1}$ wherein n is greater than 2.

5. Composition of claim 4 including up to about 50 volume % of an aryl phosphate, based on the combined volumes of said pentate salt and said nitrogen-containing phosphate.

6. Composition of claim 4 wherein said nitrogen-containing phosphate is selected from ammonium polyphosphates of the formula $(NH_4)_{n+2}P_nO_{3n+1}$ where n is greater than 50.

7. Composition of claim 6 wherein n is between 400 and 800, said pentate salt and said nitrogen-containing phosphate have an average particle size of less than about 30 microns.

8. Composition of claim 7 wherein said pentate salt and said nitrogen-containing phosphate have an averge particle size of about 10 microns or less.

9. Composition of claim 6 wherein said pentate salt and said nitrogen-containing phosphate have an average particle size of 10 microns or less.

10. Composition of claim 5 wherein said aryl phosphate is a mixture of isopropylphenyl and phenyl phosphates and amount thereof is 10 to 30 volume %; said pentate salt is melammonium pentate; said nitrogen-containing phosphate is ammonium polyphosphate; and said pentate salt and said nitrogen-containing phosphate have an average particle size of about 10 microns or less.

11. Flame retardant polyurethane composition comprising a thermoplastic polyurethane, a pentate salt of an amine-s-triazine or a mixture thereof, and a nitrogen-containing phosphate selected from amine phosphates, ammonium phosphates, ammonium polyphosphates, and mixtures thereof.

12. Composition of claim 11 wherein said pentate salt and said nitrogen-containing phosphate are present in an amount sufficient to render said composition intumescent and drip retardant on combustion.

13. Composition of claim 11 wherein said nitrogen-containing phosphate is present in amount of 10 to 99 volume % and said pentate is present in amount of 90 to 1 volume %, the total of said pentate salt and said nitrogen-containing phosphate in said composition being in the range of 5 to 50 volume %, based on the total volume of said polyurethane, said pentate salt, and said nitrogen-containing phosphate.

14. Composition of claim 11 wherein said nitrogen-containing phosphate is present in amount of 25 to 95 volume % and said pentate salt is present in amount of 75 to 5 volume %, the total of said pentate salt and said nitrogen-containing phosphate in said composition being 10 to 35 volume %, based on the total volume of said polyurethane, said pentate salt, and said nitrogen-containing phosphate.

15. Composition of claim 12 wherein said pentate salt is selected from melammonium pentate, the pentate salt of ammelide, and mixtures thereof; and said nitrogen-containing phosphate is selected from ammonium polyphosphate of the formula $(NH_4)_{n+2}P_nO_{3n+1}$ wherein molecular weight thereof is high enough so that said polyphosphate has low solubility in water.

16. Composition of claim 15 including up to about 20 volume % of an aryl phosphate, based on the combined volumes of said polyurethane, said pentate salt, said nitrogen-containing phosphate, and said aryl phosphate.

17. Composition of claim 13 wherein n is between 400 and 800, said pentate salt and said nitrogen-containing phosphate have an average particle size of less than about 30 microns.

18. Composition of claim 13 wherein said pentate salt and said nitrogen-containing phosphate have an average particle size of about 10 microns or less and wherein said n is greater than 50.

19. Composition of claim 18 including 1 to 10 volume % of triaryl phosphate, based on the combined volumes of said polyurethane, said pentate salt, said nitrogen-containing phosphate, and said triaryl phosphate.

20. Composition of claim 18 wherein said pentate salt is melammonium pentate.

21. Composition of claim 20 wherein said pentate salt and said nitrogen-containing phosphate are present in an amount sufficient to render said composition intumescent and non-dripping on combustion.

22. Composition of claim 12 wherein said thermoplastic polyurethane is an elastomer having Tg of less than 0° C. and the relative amount of said pentate salt to said nitrogen-containing phosphate being such that the combination produces unexpected results in terms of oxygen index and UL-94 rating.

23. Composition of claim 22 wherein said polyurethane elastomer is linear, has Tg in the range of −10° C. to −55° C., and contains alternating hard and soft segments, said composition being halogen-free, having oxygen index of 29 or greater, drip retardant, meets UL94-VO rating, Vicat softening temperature of 75° C. or greater, ultimate tensile strength of 8 MPa or greater, and ultimate elongation of 200% or better.

24. Composition of claim 23 including 1 to 10 volume % of triary phosphates, based on combined volumes of said polyurethane elastomer, said pentate salt, said nitrogen-containing phosphate, and said triaryl phosphate.

25. Composition of claim 24 wherein said triary phosphate is a mixture of isopropylphenyl and phenyl phosphates; said pentate salt is melammonium pentate; said nitrogen-containing phosphate is ammonium polyphosphate of the formula $(NH_4)_{n+2}P_nO_{3n+1}$ where n is greater than 50; said nitrogen-containing phosphate is present in amount of 25 to 95 volume % and said pentate salt is present in amount of 75 to 5 volume %, based on the total volume of said phosphate and said pentate salt, and the total of said phosphate and said pentate salt in said compositions is 10 to 35 volume %, based on the total volume of said polyurethane, said phosphate, and said pentate salt.

* * * * *